Figure 1:
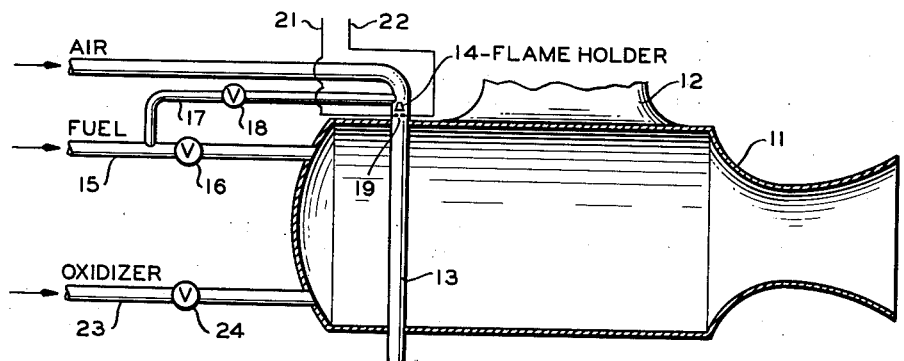

May 19, 1964          H. M. FOX          3,133,409
IGNITION SYSTEM FOR LIQUID FUEL ROCKET UNITS
Filed July 27, 1953          2 Sheets-Sheet 1

INVENTOR.
H. M. FOX
BY Hudson and Young
ATTORNEYS

May 19, 1964  H. M. FOX  3,133,409
IGNITION SYSTEM FOR LIQUID FUEL ROCKET UNITS
Filed July 27, 1953  2 Sheets-Sheet 2

INVENTOR.
H. M. FOX
BY Hudson and Young

ATTORNEYS

United States Patent Office 3,133,409
Patented May 19, 1964

3,133,409
IGNITION SYSTEM FOR LIQUID FUEL
ROCKET UNITS
Homer M. Fox, Bartlesville, Okla., assignor to Phillips
Petroleum Company, a corporation of Delaware
Filed July 27, 1953, Ser. No. 370,471
4 Claims. (Cl. 60—35.6)

This invention relates to an ignition system for liquid fuel rocket units. In one of its more specific aspects, it relates to a method and apparatus for igniting the liquid fuel in a rocket unit attached to an aircraft for assisted takeoff and for superperformance at altitude. In another of its more specific aspects, it relates to a method and apparatus for obtaining stable combustion in a liquid fuel rocket unit attached to an aircraft for assisted takeoff and for superperformance at altitude.

Auxiliary power units are often employed in assisting the takeoff of sea planes and heavily loaded land planes because it is well-known that only a fraction of the power available in modern aircraft is used in flight as compared with that necessary to lift the aircraft from the ground under ordinary takeoff conditions. These auxiliary power units are commonly referred to as JATO units and are more commonly employed on jet engine propelled aircraft, although they also can be used on reciprocating piston engine propelled aircraft. Rocket motors are usually employed as JATO units.

Either solid or liquid fuels can be used in JATO units but solid fuels are considered impractical for giving superperformance to planes in flight. Therefore, liquid fuel rockets would be required in order to perform both functions of giving accelerated takeoff and accelerated speed to jet planes. Advantages of liquid propellant units are:

(1) A liquid propellant unit can be started and stopped at will by the remote operation of propellant control valves. This cannot be done with solid propellant systems; once they have been started they cannot be stopped in any practical manner.

(2) The liquid propellant units can be operated for extended periods limited only by the capacity of the propellant supply tanks.

(3) The liquid propellant units are light in weight.

(4) The liquid propellant units may be cooled by circulating one of the propellants around the combustion chamber and nozzle.

(5) Liquid propellant fuels have a high specific thrust.

(6) Liquid propellant fuels are usually less expensive than solid propellant fuels.

It would be desirable to use the same fuel in the JATO rocket units as is used in the aircraft being assisted because in this manner, auxiliary fuel storage would be avoided and the operation of the rocket unit would be simplified. The fuels most commonly used in aircraft jet engines at the present time are blends of hydrocarbons such as kerosene, naphtha, and gasoline, and two well-known blends are designated as JP-3 and JP-4 fuels. These fuels are not hypergolic with nitric acid or any other oxidizer which could be advantageously used, thus such fuels require ignition for starting the rocket motor. Ignition of such fuels presents a very serious problem. Using an auxiliary ignition fuel would be dangerous and would also add considerable complicated equipment. Electric starting systems have been found to be unsatisfactory because the spark sometimes fails to ignite the fuel and oxidizer instantly with the result that delayed ignition can result in an explosion within the combustion chamber. Pilot flames in the combustion chamber of the rocket are impractical because the rocket operates at such a high pressure that the pilot flame is often snuffed out before stable combustion is established.

In each of the following objects at least one of the aspects of this invention will be achieved.

It is an object of this invention to provide an improved ignition system for liquid fuel rocket units employed on aircraft for assisted takeoff and for superperformance at altitude.

It is another object to provide an apparatus for stabilizing combustion in a liquid fuel JATO rocket.

It is another object to provide an improved ignition system for liquid fuel JATO rocket units whereby ignition of the rocket fuel can be repeatedly accomplished.

Figure 2:
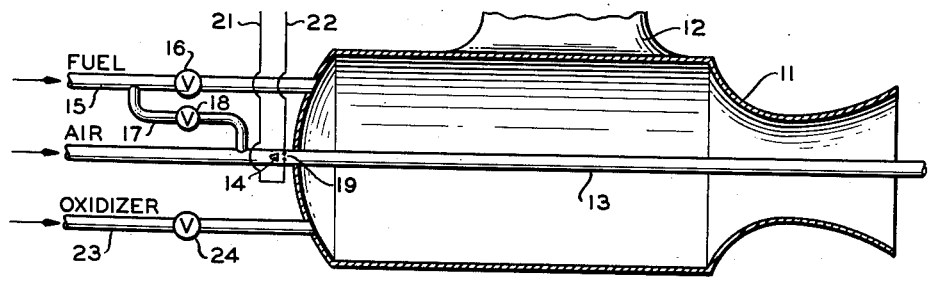
Figure 3:
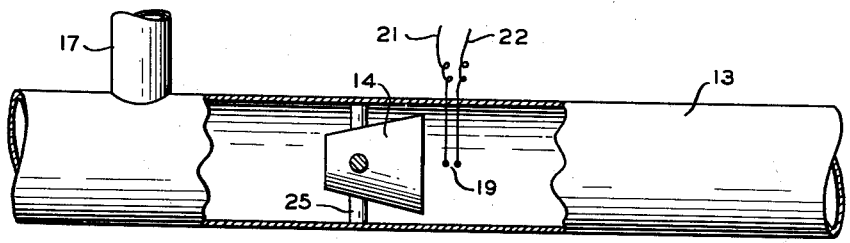
Figure 4:
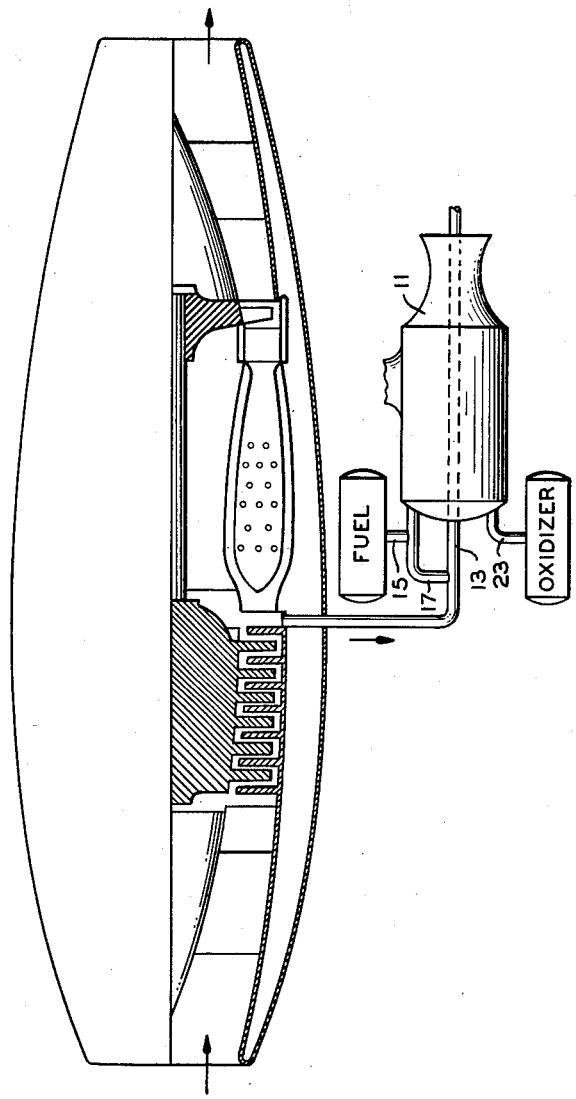

Other objects and advantages will be evident to one skilled in the art upon studying this disclosure and the attached drawing wherein:

FIGURE 1 is a schematic illustration in cross section of one embodiment of the present invention, FIGURE 2 is a schematic illustration of another embodiment of the present invention, FIGURE 3 is a detailed view in cross section of one type of flame holder which can be employed in this invention, and FIGURE 4 is a schematic illustration in partial cross section of one mode of operation of the invention.

The present invention will now be described as directed to an ignition system for liquid fuel JATO rocket units used on jet engine propelled aircraft for assisted takeoff and superperformance in flight wherein the fuel for the rocket unit is the same as that used in the jet engine of the aircraft. It is to be understood that the embodiment of the invention herein described is for purpose of illustration and that the scope of the invention is not to be limited thereby but is to be limited only by the scope of the appended claims.

In FIGURE 1, a JATO rocket unit 11 is secured by support 12 to an aircraft (not shown). A tube 13 extends transversely through the combustion chamber of rocket 11. Air is supplied to tube 13 from a source of compressed air, for example the last stage of compression of the jet engine of a jet propelled aircraft. Flame holder 14 is situated in tube 13 directly upstream, with respect to the flow of air, from the combustion chamber of rocket 11. Fuel line 15 furnishes fuel to the rocket motor, and the fuel flow is controlled by valve 16. Fuel line 17, connected to fuel line 15 upstream from valve 16, supplies fuel to tube 13 directly upstream, with respect to the air flow, from flame holder 14. The flow of fuel to flame holder 14 is controlled by valve 18 in line 17. A sparking device 19, for example a spark plug, is situated in tube 13 directly downstream from flame holder 14. Electric lines 21 and 22 furnishes electricity to sparking device 19 from a source of electric energy (not shown).

Oxidizer is furnished to the combustion chamber of the rocket unit through line 23 and the flow of oxidizer to the combustion chamber is controlled by valve 24. Valves 16, 18 and 24 can be any remotely controlled valves and such valves are well-known in the art.

FIGURE 2 illustrates another preferred embodiment of the ignition system of my invention. In FIGURE 2, wherein like numbers refer to like elements, tube 13 extends axially through the combustion chamber of the rocket 11 and extends outwardly through the nozzle of the rocket unit. In this modification, it is necessary that the nozzle of the rocket be designed with allowance made for the tube 13 to extend axially through the nozzle of the combustion chamber without interfering with the performance of the nozzle.

In FIGURE 3 a detailed view is shown of a flame holder applicable in the practice of my invention.

Flame holder 14 is shown as a hollow frusto-conical member situated in the center of tube 13 and secured there by supports 25. Flame holders are well-known to those skilled in this art and are available in a wide variety of shapes and designs. A flame holder can be made in the form of a mesh screen, solid body, or any form capable of maintaining the flow of fuel and air, under the conditions of normal operations, at a velocity greater than the velocity of flame propagation of the particular fuel and air mixture being employed so as to prevent a flash-back of the flame. Sparking device 19 is situated immediately downstream from flame holder 14.

The operation of the ignition system of my invention will now be described. Air is admitted to tube 13 from the source of compressed air, for example, from the last stage of compression of the jet aircraft engine. Fuel is admitted through line 17 to tube 13 by opening valve 18. The source of fuel will usually be from the main fuel tanks of the aircraft although fuel may be supplied from another source if desired. The fuel and air mixture is ignited by operation of sparking device 19, and the portion of tube 13 which is within the combustion chamber of the rocket 11 is quickly heated to a temperature sufficiently high so as to ignite the fuel and oxidizer mixture instantly when admitted into the combustion chamber. The heated tube also serves to maintain steady combustion during operation of the rocket motor.

When it is desired to operate the rocket motor, either for assisted takeoff or for superperformance while in flight, valve 16 in the fuel line 15 and valve 24 in oxidizer line 23 are opened so as to admit fuel and oxidizer into the combustion chamber of the rocket unit. Ignition is achieved instantly and combustion is maintained stable by the presence of the heated tube 13 in the combustion chamber. Although this invention has been described in connection with a rocket motor secured to an aircraft, it is within the scope of this invention to employ this ignition system in a rocket designed for free flight, for example, a rocket used as a missile.

In FIGURES 1 and 2 the heated pipe 13 is shown as a straight pipe through the combustion chamber. The heated pipe 13 can be straight or can be helical, spiral or any form so as to present the desired amount of heated surface to furnish instantaneous ignition of the mixture of fuel and oxidizer that is introduced into the combustion chamber.

FIGURE 4 provides a schematic illustration of one mode of utilizing compressed air from the last stage of compression of a jet engine as the source of air for the ignition tube 13.

Any suitable oxidant such as oxygen, ozone, hydrogen peroxide, white fuming nitric acid (WFNA), red fuming nitric acid (RFNA), and etc., can be employed in conjunction with the JP-3 or JP-4 fuel or straight aviation gasoline. The attainable thrust with liquid oxygen and gasoline is relatively high: 242 lbs. thrust/lb./sec. of propellant for a chamber pressure of 300 p.s.i.a. The chamber temperature is above 5200° F.

The power necessary to operate the pumps and compressors of the rocket unit is preferably and readily obtained by means of a power take-off from the main aircraft engine. Another pressurizing means for supplying fuel to the rocket unit can be an inert gas held in a separate container at high pressure.

Reasonable variations and modifications are possible within the scope of the present invention, the essence of which is an improved method and device for igniting a liquid fuel rocket which comprises maintaining a surface within the combustion chamber of the rocket at a sufficiently high temperature to ignite the liquid rocket propellant by heating said surface with a flame which is isolated from the combustion chamber.

I claim:

1. In a liquid-bipropellant rocket attached to a jet engine propelled aircraft for assisted takeoff and superperformance at altitude a rocket combustion chamber having a fuel inlet, an oxidizer inlet and an exhaust nozzle; a conduit extending through said combustion chamber; means for supplying fuel from said aircraft fuel tank to said conduit; means for supplying air from the last stage of the compressor of said jet engine to said conduit so as to form a stream of inflammable mixture in said conduit; flame holder means located in said conduit directly upstream from said combustion chamber; electrical spark means for igniting said mixture at said flame holder, said spark means receiving electrical current from a generator operated by said jet engine; means for supplying fuel from said aircraft fuel tank to said combustion chamber; and means for supplying oxidizer from a storage tank to said combustion chamber whereby a mixture of said fuel and oxidizer is ignited by said conduit heated by the fuel and air mixture therein.

2. For use in a liquid-bipropellant rocket motor having a combustion chamber, an exhaust nozzle and fuel and oxidizer inlets, ignition apparatus comprising a conduit extending through said combustion chamber; means for supplying a fuel and air mixture to said conduit; means for igniting said fuel and air mixture within said conduit; means for stabilizing a resulting flame within said conduit at a point adjacent said fuel and oxidizer inlets; and means for supplying fuel and oxidizer to said inlets whereby said fuel and oxidizer are ignited upon entrance to said combustion chamber.

3. For use in an aircraft-borne, liquid-fuel rocket motor having a combustion chamber, exhaust nozzle, fuel inlet and oxidizer inlet, an ignition system comprising a conduit extending through said combustion chamber so that at least a portion of said conduit is nearer to the fuel and oxidizer inlets than to the exhaust nozzle; means for supplying a fuel and air mixture to said conduit; means for igniting said mixture in said conduit; means for stabilizing the resulting flame in said conduit adjacent said fuel and oxidizer inlets; and means for supplying fuel and oxidizer to said inlets.

4. For use in a jet engine aircraft-borne, liquid-fuel rocket motor having a combustion chamber, exhaust nozzle, fuel inlet and oxidizer inlet, an ignition system comprising a conduit extending through said combustion chamber so that at least a portion of said conduit is nearer to the fuel and oxidizer inlets than to the exhaust nozzle; means for supplying fuel to said conduit; means for supplying air from the compressor of the jet engine to said conduit so as to form an inflammable mixture in said conduit; means for igniting said mixture in said conduit; means for stabilizing the resulting flame in said conduit adjacent said fuel and oxidizer inlets; and means for supplying fuel and oxidizer to said inlets.

References Cited in the file of this patent

UNITED STATES PATENTS

| | | |
|---|---|---|
| 617,753 | Pontois | Jan. 17, 1899 |
| 1,253,522 | Patterson | Jan. 15, 1918 |
| 2,563,029 | Goddard | Aug. 7, 1951 |
| 2,702,452 | Taylor | Feb. 22, 1955 |